(12) United States Patent
Zhu et al.

(10) Patent No.: US 11,023,854 B1
(45) Date of Patent: Jun. 1, 2021

(54) ELECTRONICALLY ADDRESSABLE DOCUMENT RECEPTACLE WITH A-POLAR CONNECTIVITY

(71) Applicants: Shengbo Zhu, San Jose, CA (US); Su Shiong Huang, Belleville, WA (US)

(72) Inventors: Shengbo Zhu, San Jose, CA (US); Su Shiong Huang, Belleville, WA (US)

(73) Assignee: iMICRODATA CORPORATION, San Jose, CA (US)

( * ) Notice: Subject to any disclaimer, the term of this patent is extended or adjusted under 35 U.S.C. 154(b) by 0 days.

(21) Appl. No.: 16/873,921

(22) Filed: Aug. 17, 2020

(51) Int. Cl.
| | |
|---|---|
| *G06Q 10/08* | (2012.01) |
| *H05B 45/10* | (2020.01) |
| *B42F 13/22* | (2006.01) |
| *B42F 15/00* | (2006.01) |
| *G06Q 10/10* | (2012.01) |
| *G08B 5/36* | (2006.01) |
| *G05B 19/042* | (2006.01) |

(52) U.S. Cl.
CPC .......... *G06Q 10/087* (2013.01); *B42F 13/22* (2013.01); *B42F 15/0035* (2013.01); *G05B 19/042* (2013.01); *G06Q 10/10* (2013.01); *G08B 5/36* (2013.01); *H05B 45/10* (2020.01); *B42P 2241/10* (2013.01); *G05B 2219/25257* (2013.01)

(58) Field of Classification Search
None
See application file for complete search history.

(56) References Cited

U.S. PATENT DOCUMENTS

| 8,115,629 B2 * | 2/2012 | Zhu | ...................... G06Q 10/087 340/570 |
| 8,717,143 B2 * | 5/2014 | Zhu | .......................... B42F 13/40 340/8.1 |

* cited by examiner

*Primary Examiner* — Anh Q Tran

(57) ABSTRACT

An electronically addressable a-polar document receptacle identification circuit has first and second terminals adapted to be connected to a two conductor data bus for supplying data signals to the terminals and for receiving responses from the circuit. The circuit has a two phase diode bridge circuit with first and second nodes connected to the first and second terminals. The diode bridge circuit is connect to the data signal input of a circuit microcontroller having an output connected to the first and second nodes for furnishing response signals to the nodes. The associated receptacle can be a file folder removably received in a file cabinet or a notebook binder removably received on a cabinet shelf. The circuit will function correctly regardless of the orientation of the terminals with respect to the data bus conductors so a file folder or a notebook binder can be installed in either one of two possible orientations without affecting the functionality of the circuit.

9 Claims, 11 Drawing Sheets

ELECTRONICALLY ADDRESSABLE DOCUMENT RECEPTACLE WITH A-POLAR CONNECTIVITY

BACKGROUND OF THE INVENTION

This invention relates to document retention in general, and more specifically to document storage and retrieval.

Individual documents are commonly retrievably stored in file folders designed to be removably installed in filing cabinets having one or more drawers slidably mounted therein, with each drawer having a laterally spaced pair of upper support rails for supporting individual file folders. Each support rail has an electrically conductive path which is coupled at one end to a file cabinet microcontroller unit which provides data and power thereto. The cabinet microcontroller unit is coupled to a system computer which controls the entire document storage and management system. Each file folder is a document receptacle formed from a single sheet of suitable material (typically durable paper stock) folded about the longitudinal center. Each leaf of a file folder is provided with a mechanical brace secured to the upper margin of the associated leaf. Each brace is provided with a pair of downwardly opening channels adjacent the opposite ends thereof and designed to receive the drawer support rails of the respective cabinet drawer when the file folder is installed in the drawer. Thus, the lateral spacing of the channels of the braces is chosen to match the lateral separation distance of the drawer support rails. One of the file folder mechanical braces is provided with a pair of electrically conductive paths which extend between a file folder electronically addressable decoder or a microcontroller unit (MCU) carried by the brace and an electrically conductive spring connector positioned in the associated downwardly opening channel at the end of the brace. Consequently, data and power signals present on one of the two support rail electrically conductive paths are supplied to the folder MCU and response signals from the folder MCU are supplied to the support rail electrically conductive path when the folder is properly installed on the support rails with the springs in ohmic contact with the support rail electrically conductive paths.

In use, one or more documents are inserted into the folder space between leaves of the file folder, and the file folder is installed in one of the cabinet drawers by manipulating the file folder downward into an open cabinet drawer until the channel springs of the file folder brace having the MCU are received by the cabinet support rail electrically conductive paths and the downwardly opening channels of the other file folder brace are received by the support rails. When the document is to be retrieved, the normally-closed cabinet drawer is opened, the file folder is either spread apart by the user and the desired document is removed from the folder, or the folder itself is removed from the cabinet support rails, spread apart, and the desired document is removed.

In order to provide some measure of security for a document storage and retrieval system of the type described above, and to facilitate the search for a file folder containing a sought document, various techniques have been introduced. One such technique uses computer controlled access to the individual file cabinet drawers. In a typical system of this type, the user enters a password and the system identifying code for the file folder or document being sought into a computer terminal connected to a system computer. If the password permits access to the system by the user, the system computer searches a system data base for the cabinet and drawer location of the item being sought, sends the address signals to the filing cabinets and, if a match is found by a folder decoder or MCU, signals the cabinet in which the item resides to illuminate a visible indicator located on the drawer front of the drawer containing the file folder in which the sought item is presumably located and to unlock the drawer containing the sought item. The user is then permitted to open the drawer and search for the file folder. The file folders have visible indicators located along the upper margin, which can be activated by the folder MCU when the file folder is the one sought. Once the file folder is located, the user can then extract the document sought. If the user disconnects any file folder brace having the decoder or MCU from the cabinet support rails during this process, this event is detected by sensing circuitry in the cabinet and information regarding the identity of the disconnected file folder is transmitted back to the system computer. An example of such a file cabinet system is disclosed in U.S. Pat. No. 8,471,717 issued Jun. 25, 2013 for "Collective Objects Management System With Object Identification Using Addressable Decoder Units", the disclosure of which is hereby incorporated by reference.

Another document storage and retrieval system involves the use of notebook binders removably stored on shelves of open-faced cabinets. This type of document management system utilizes a cabinet with shelves for removable storage of electronically searchable binders. Each binder has a body with front and rear covers and a spine. Inside the body is a binder mechanism for removably retaining documents. Each binder has externally extending upper and lower ohmic contact members which ohmically engage conductive members mounted on the confronting shelf surfaces near the front of the cabinet. Each binder has a binder identification circuit (such as a binder MCU) coupled to an LED mounted on the binder spine in a location visible when the binder rests on a shelf. When a binder identification signal from a host computer is presented to the shelf conductive members it is transferred by the binder contact members to the binder identification circuit. If the binder identification signal matches a code stored in the binder identification circuit, the binder LED is activated to aid the user in finding the binder. An LED and an optional audible indicator are mounted on the shelves to further aid the user in finding the sought binder. An example of this type of document storage and retrieval system is disclosed in U.S. Pat. No. 8,717,143 issued May 6, 2014 for "Searchable Binder", the disclosure of which is hereby incorporated by reference.

While the file cabinet/file folder arrangement and the notebook binder arrangement described above are functionally desirable and useful, both suffer from the disadvantage of being polarity sensitive, ie each file folder and each binder must be installed with correct polarity with the positive input connector of the file folder or binder in ohmic contact with the positive data and power supply conductor and the negative input connector of the file folder or binder in ohmic contact with the negative supply conductor. More specifically, FIG. 1 depicts a prior art file folder or binder circuit which illustrates the polarity required in the prior art circuitry in order for a given file folder or binder to function properly. With reference to this Fig., a receptacle identification circuit generally designated with reference numeral 10 includes a pair of terminals 12, 14 for connection to a two conductor system data bus, with terminal 12 designed to be connected to the positive bus conductor and terminal 14 designed to be connected to the negative bus conductor. Terminal 12 is connected to a circuit node 15, which is connected to three different circuit paths. A first circuit path comprises a rectifying diode 16 and a capacitor 17 for supplying D.C. power Vdd to a circuit microcontroller unit (MCU) 20. This D.C. power is also supplied to the emitter of an output transistor 22 via a resistor 23. The output of diode 16 is also coupled to an LED illumination diode 25 via a resistor 26 so that diode 25 is activated whenever D.C. power is present in circuit 10. A second circuit path is a data input path from node 15 to the data input of MCU 20 via a resistor 28. A third circuit path is a data output path from a first output of MCU 20, transistor 22 and a capacitor 30 to node 15. A second output of MCU 20 is used to activate a second illumination diode 31 whenever MCU 20 detects a match between incoming data signals specifying a receptacle and a receptacle identification code stored in MCU 20 memory.

As is apparent from the structure of circuit 10 as depicted in FIG. 1, when circuit 10 is connected to the system data bus with correct polarity—as shown in FIG. 1—the circuit 10 will function in the intended manner. However, when circuit 10 is connected to the system data bus with reverse polarity—with input terminal 12 connected to the negative bus conductor and input terminal 14 connected to the positive bus conductor-circuit 10 cannot function. Consequently, a file folder or a binder incorporating circuit 10 must always be installed with the proper orientation in order for the document storage and retrieval system to operate in the intended efficient manner. Unfortunately, this proper orientation is not always observed in practice, particularly when a worker is tasked with returning large numbers of file folders or binders to storage.

SUMMARY OF THE INVENTION

The invention comprises an addressable document receptacle for use in a document storage and retrieval system which has a-polar electrical connectivity so that the receptacle will function properly regardless of the electrical polarity orientation of the receptacle in the system.

In a broadest aspect, the invention comprises an electronically addressable a-polar document receptacle identification circuit including first and second terminals adapted to be ohmically connected to a two conductor system data bus; a two phase diode bridge circuit having first and second nodes connected respectively to the first and second terminals; and a circuit microcontroller (MCU) unit having a data signal input for receiving data signals from the two phase diode bridge circuit and a first output for providing response signals to at least one of the first and second nodes.

The two phase diode bridge circuit includes a rectifying diode for rectifying data signals present on the first and second terminals and a capacitor coupled to the rectifying diode and the circuit microcontroller for supplying D.C power to the circuit microcontroller when data signals are present at one of the first and second terminals. The two phase diode bridge circuit comprises four diodes each having an anode and a cathode, a first one of the four diodes having a cathode connected to the first node and an anode connected to circuit ground, a second diode having an anode connected to the first node, a third diode having a cathode connected to the second node and an anode connected to circuit ground, and a fourth diode having an anode connected to the second node and a cathode connected to the cathode of the second diode.

The invention further includes a first channel diode having an anode connected to the first node and a cathode coupled to the data signal input of the circuit microcontroller unit; and a second channel diode having an anode connected to the second node and a cathode coupled to the data signal input of said circuit microcontroller unit. The diodes are preferably germanium diodes.

The invention further includes a first LED having an anode and a cathode, with the anode connected to the rectifying diode and the cathode connected to circuit ground wherein the LED is activated when data signals are present at one of the first and second terminals.

The circuit microcontroller unit further includes a second output and a memory having stored therein an identification code uniquely identifying the associated document receptacle; and the invention further includes a second LED having an anode connected to the second circuit microcontroller output and a cathode connected to circuit ground, and the circuit microcontroller is configured to generate an activation signal on the second output when a data signal received at the circuit microcontroller data signal input matches the stored identification code.

The document receptacle identification circuit can be incorporated into a file folder support brace and a notebook binder.

The invention eliminates the need for a user to observe polarity when installing a document receptacle into its storage cabinet, which facilitates re-installation of removed receptacles. More particularly, a circuit fabricated in accordance with the teachings of the invention will function correctly regardless of the polarity orientation of the circuit. Stated differently, the circuit is truly a-polar.

For a fuller understanding of the nature and advantages of the invention, reference should be made to the ensuing detailed description taken in conjunction with the accompanying drawings.

BRIEF DESCRIPTION OF THE DRAWINGS

FIG. 3b is a circuit schematic of the preferred embodiment of FIG. 2 connected to a two conductor system bus with a second polarity reverse from that of FIG. 3a;

DETAILED DESCRIPTION OF THE PREFERRED EMBODIMENTS

Figure 1:
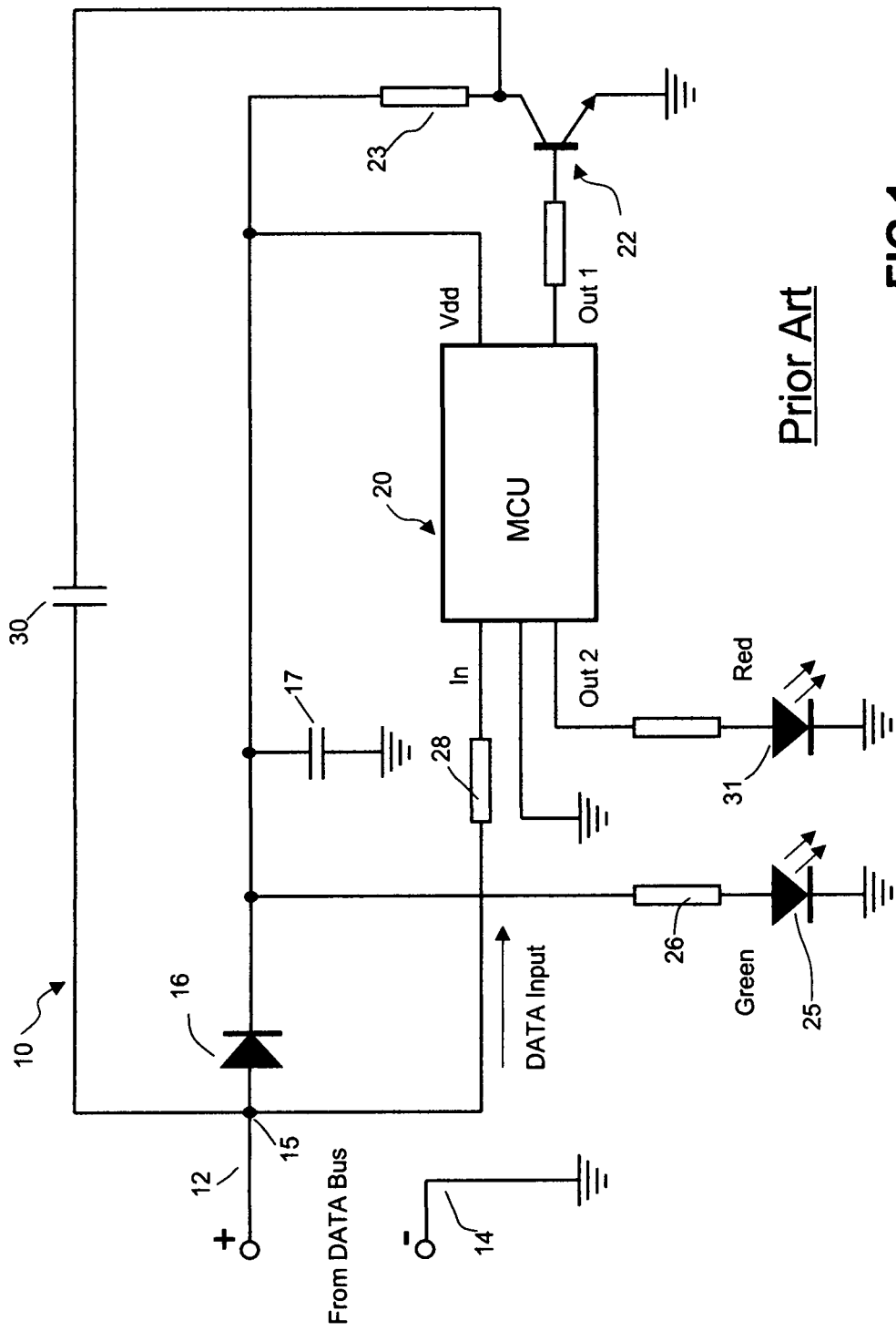
FIG. 1 is a circuit schematic of a prior art polarity sensitive document receptacle identification circuit.
Figure 2:
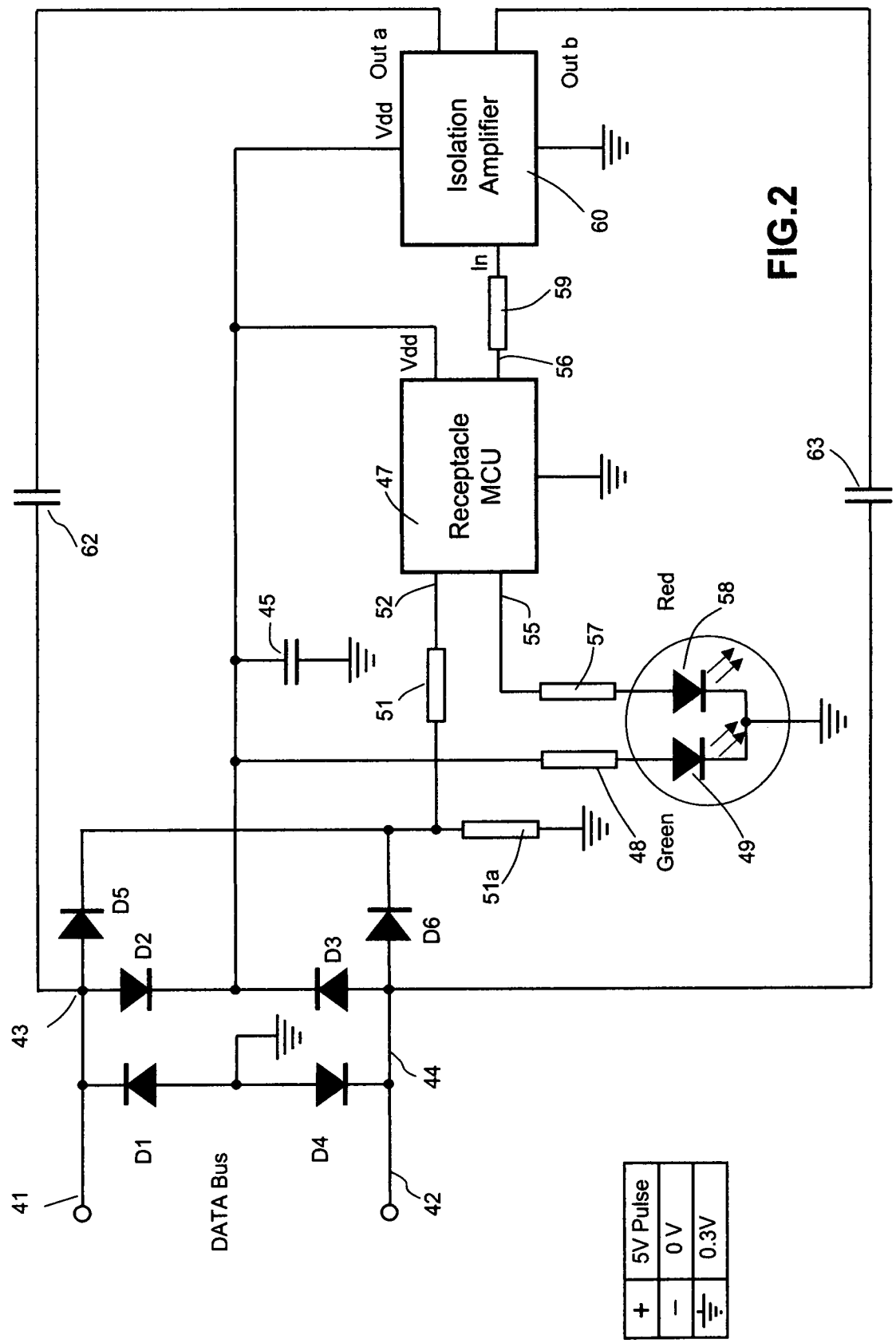
FIG. 2 is a circuit schematic of the preferred embodiment of an a-polar document receptacle identification circuit according to the invention.

Turning now to the drawings illustrating the invention, FIG. 2 is a circuit schematic of the preferred embodiment of an a-polar document receptacle identification circuit according to the invention. The term "a-polar" as employed in this disclosure denotes a circuit which is not affected functionally by the electrical polarity of the external connections to a two conductor system bus. As seen in FIG. 2, a receptacle identification circuit generally designated with reference numeral 40 includes a pair of terminals 41, 42 for ohmic connection to a two conductor system data bus (not illustrated), which supplies data signals to circuit 40 and receives responses therefrom. Terminal 41 is connected to a first node 43 of a two phase diode bridge circuit consisting of four diodes D1, D2, D3, and D4 configured as shown; while terminal 42 is connected to a second node 44 of the diode bridge circuit. The junction between the anodes of diodes D1 and D4 are ohmically connected to receptacle identification circuit ground, as illustrated. Receptacle identification circuit ground is about 0.3 volts, while system ground is 0.0 volt.

When data signals are presented to terminal 41 these signals flow along two different circuit paths. A first circuit path comprises diode D2 which functions as a data signal rectifying diode and a capacitor 45 for supplying D.C. power Vdd to a circuit microcontroller unit (MCU) 47. MCU 47 is configured to receive data signals from a source, which can be a file drawer MCU or a binder cabinet MCU, both described below, and to respond to those signals. One such data signal is a unique system identification code specifying a document receptacle being sought by a user. In response, MCU is configured to provide an output signal indicating that the received system identification code signal matches the receptacle identification code stored in MCU 47 memory. MCU 47 is preferably a type PIC10F202 unit available from Microchip Technology of Chandler, Ariz.

The D.C. power emanating from diode D2 is also supplied via a resistor 48 to the anode of an LED 49 with a cathode ohmically connected to receptacle identification circuit ground so that diode 49 is activated whenever D.C. power is present in circuit 40. A second circuit path is a data input path from node 43 and a one-way data channel diode D5 to the data input 52 of MCU 47 via a resistor 51.

When data signals are presented to terminal 42 these signals also flow along two different circuit paths. A first circuit path comprises diode D3 which functions as a data signal rectifying diode and a capacitor 45 for supplying D.C. power Vdd to circuit microcontroller unit (MCU) 47. The D.C. power emanating from diode D3 is also supplied via a resistor 48 to the anode of LED 49 with a cathode ohmically connected to receptacle identification circuit ground so that diode 49 is activated whenever D.C. power is present in circuit 40. A second circuit path is a data input path from node 44 and a one-way data channel diode D6 to the data input 52 of MCU 47 via a resistor 51.

In the system in which the preferred embodiment of the invention is designed to operate, the maximum voltage level of the data input signals is 5.0 volts. Since the voltage drop across a silicon diode is about 0.7 volt, the cumulative voltage drop of the data input signals through the diode bridge circuit may result in data signals presented to the input of MCU 47 which are close to the operating threshold of MCU 47.

Consequently, it is preferred to employ germanium diodes which exhibit a voltage drop of 0.3 volt, which makes the signal processing of the diode bridge more reliable. For systems with data input signals higher than the maximum of 5.0 volts, silicon diodes may be acceptable.

MCU 47 has a pair of data outputs 55, 56. First data output 55 is connected via a resistor 57 to the anode of an LED 58 with a cathode ohmically connected to receptacle identification circuit ground so that diode 58 is activated whenever the signal on first output of MCU 47 is at an active state. MCU 47 is configured to place an active level signal on output 55 whenever MCU 47 detects a match between incoming data signals specifying a receptacle and the receptacle identification code stored in MCU 47 memory. Second data output 56 of MCU 47 is coupled via a resistor 59 to the primary of an isolation unit 60. Isolation unit 60 is preferably a type AMC1301 isolation amplifier integrated circuit available from Texas Instruments of Dallas, Tex. One terminal of isolation unit 60 is coupled via a capacitor 62 to node 43 to cause response signals generated by MCU 47 to appear at terminal 41; the other terminal of isolation unit 60 is coupled via a capacitor 63 to node 44.

Figure 3A:
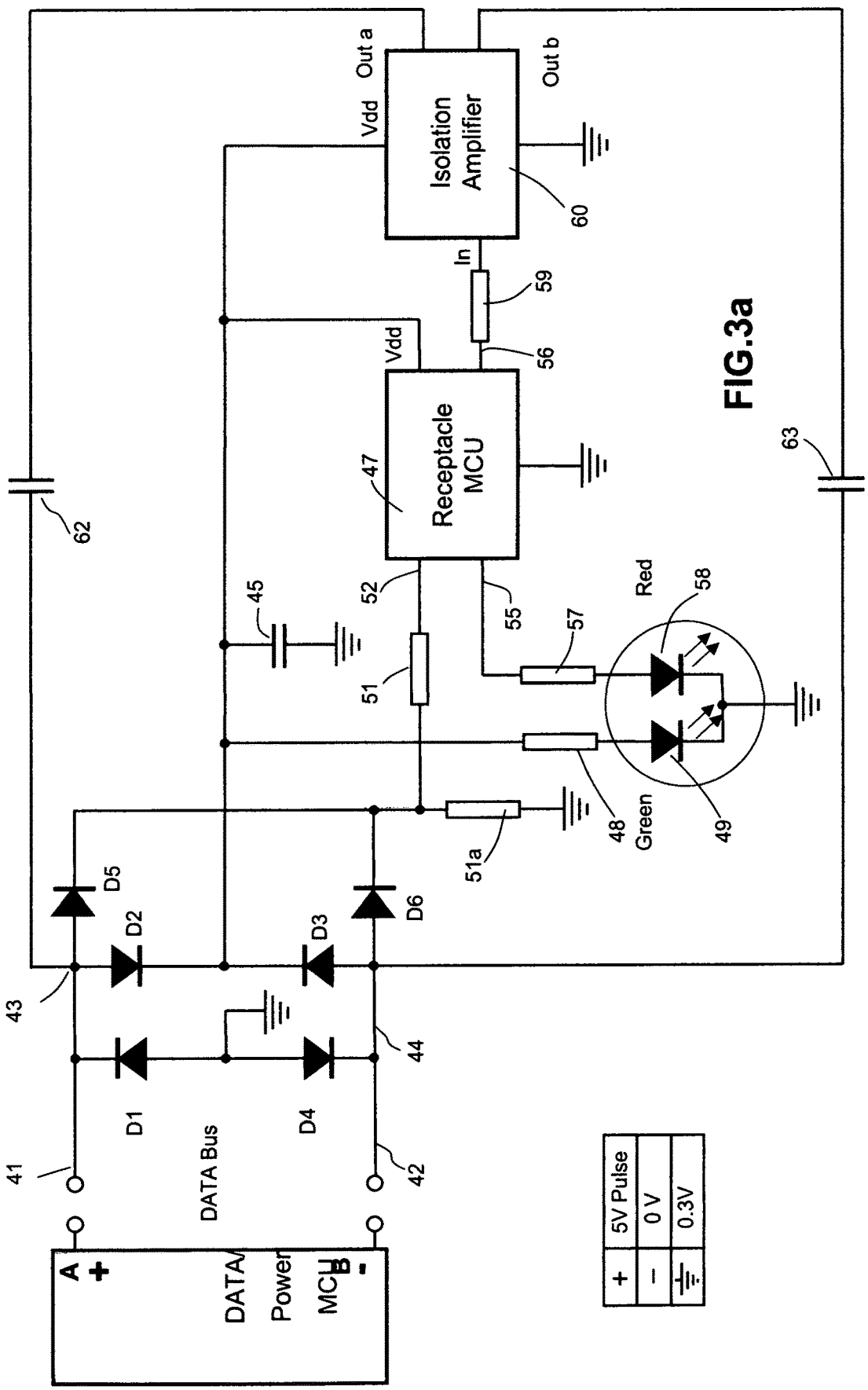
FIG. 3a is a circuit schematic of the preferred embodiment of FIG. 2 connected to a two conductor system bus with a first polarity.
Figure 3B:
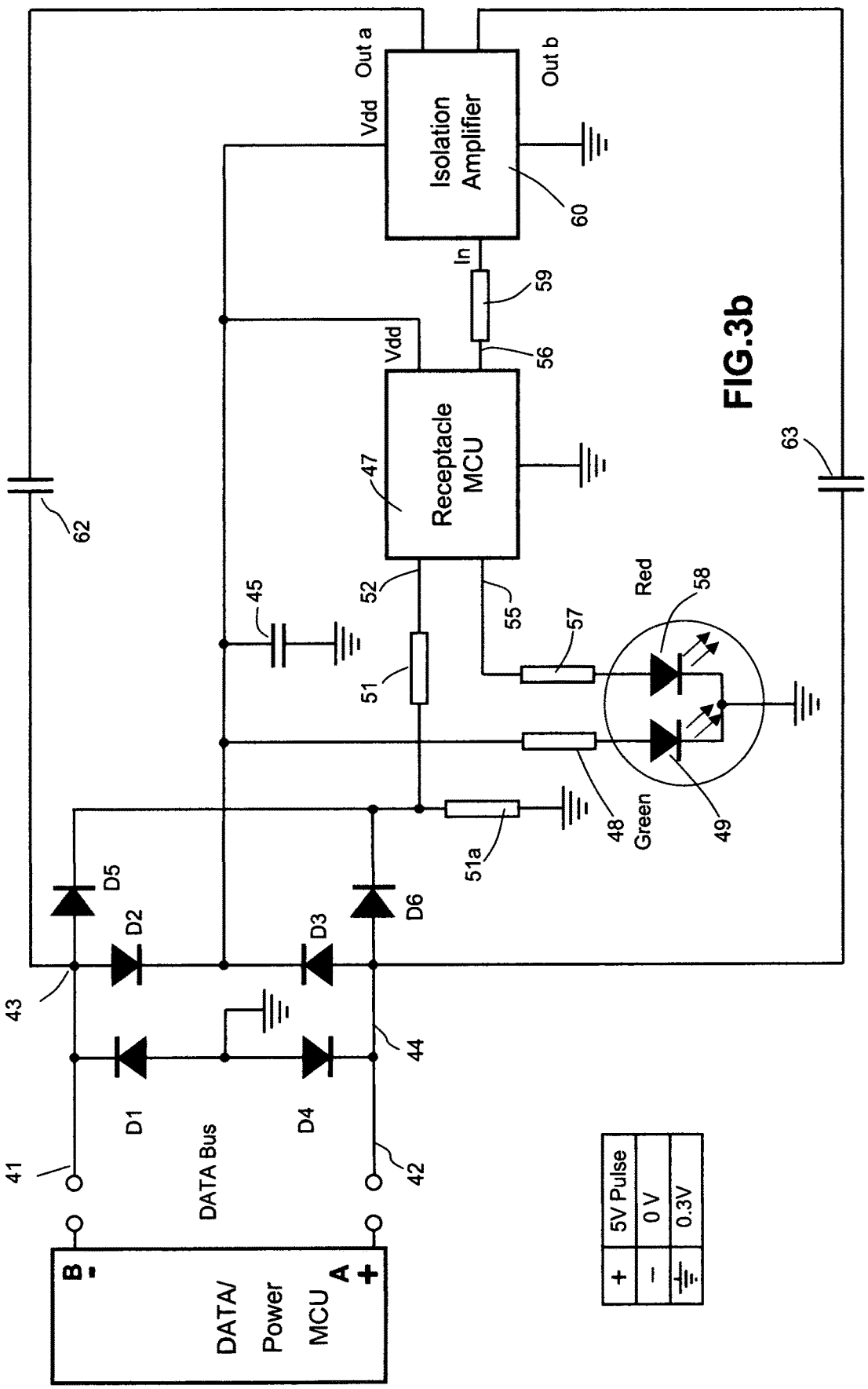

FIGS. 3a and 3b illustrate the a-polarity of the receptacle identification circuit 40. FIG. 3a illustrates the structure and function of circuit 40 during data input mode when circuit terminal 41 is connected to the normally positive (+) system bus conductor which carries the data signals, and circuit terminal 42 is connected to the normally negative (−) system bus conductor which is connected to system ground. In this configuration, Vdd power is provided by diode D2 and capacitor 45, while data signals are furnished to input 52 of MCU47 via channel diode D5 and resistor 51. FIG. 3b illustrates the structure and function of circuit 40 during data input mode when circuit terminal 41 is connected to the normally negative (−) system bus conductor which is connected to system ground, and circuit terminal 42 is connected to the normally positive (+) system bus conductor which carries the data signals. In this configuration, Vdd power is provided by diode D3 and capacitor 45, while data signals are furnished to input 52 of MCU47 via channel diode D6 and resistor 51. Thus, the a-polar document receptacle identification circuit according to the invention functions correctly regardless of the polarity connections to the two conductor system bus.

Figure 4:
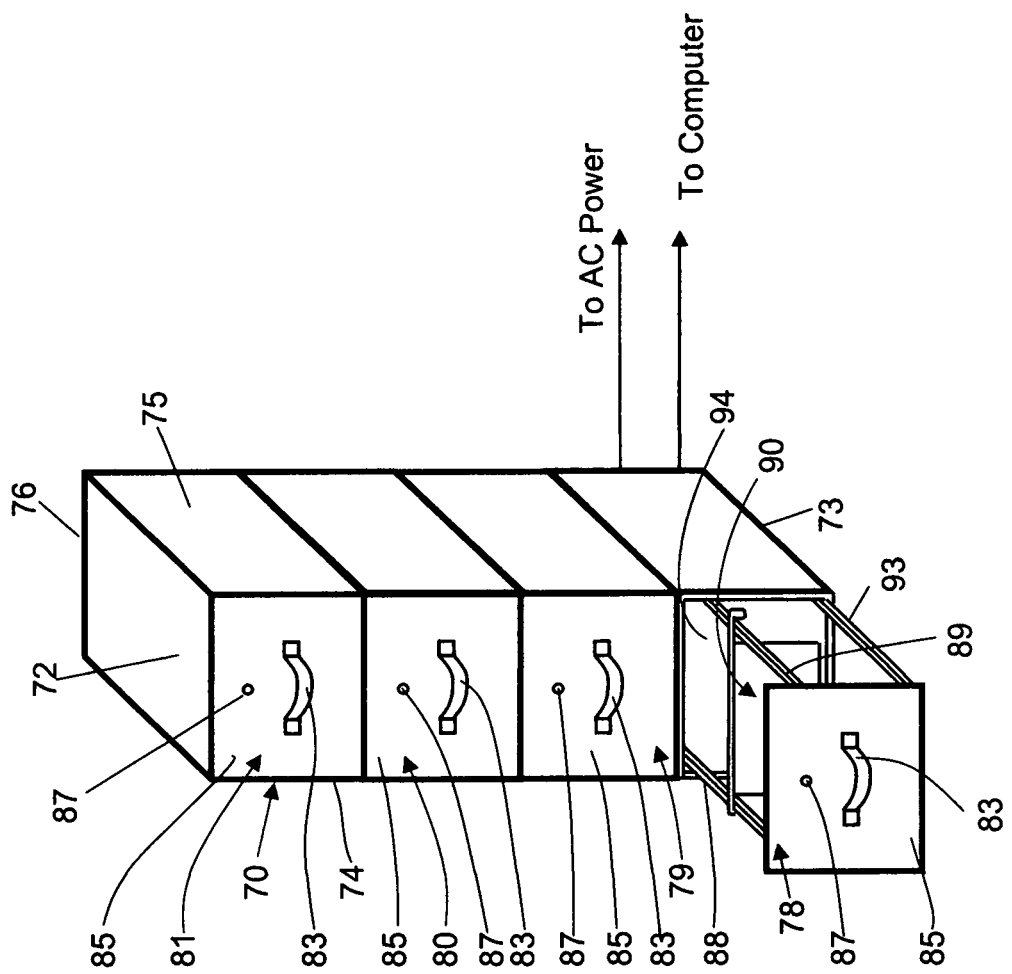
FIG. 4 is a perspective view of a four drawer file cabinet incorporating the FIG. 2 preferred embodiment of the invention
Figure 5:
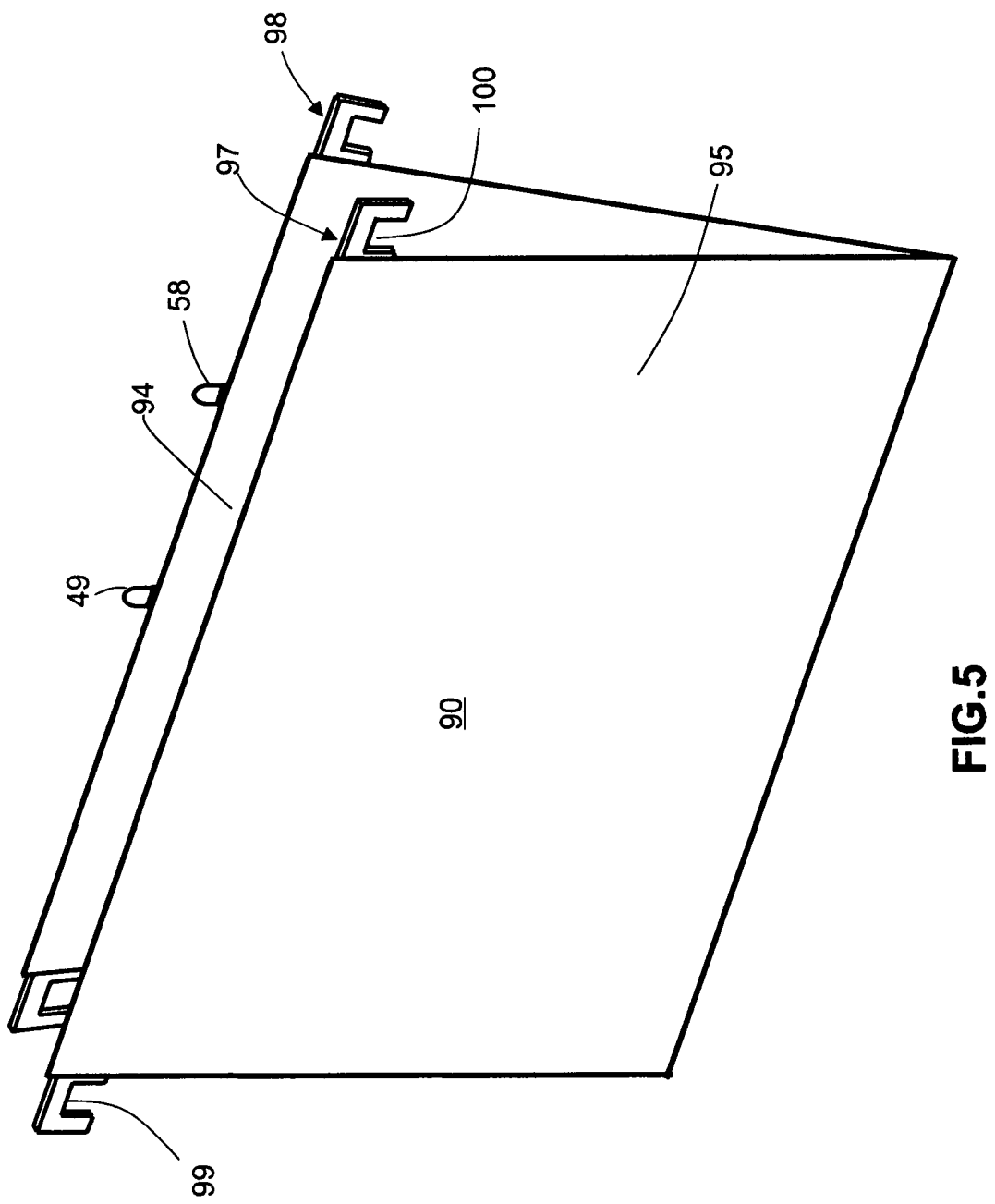
FIG. 5 is a perspective view of a file folder incorporating the FIG. 2 preferred embodiment of the invention.
Figure 6:
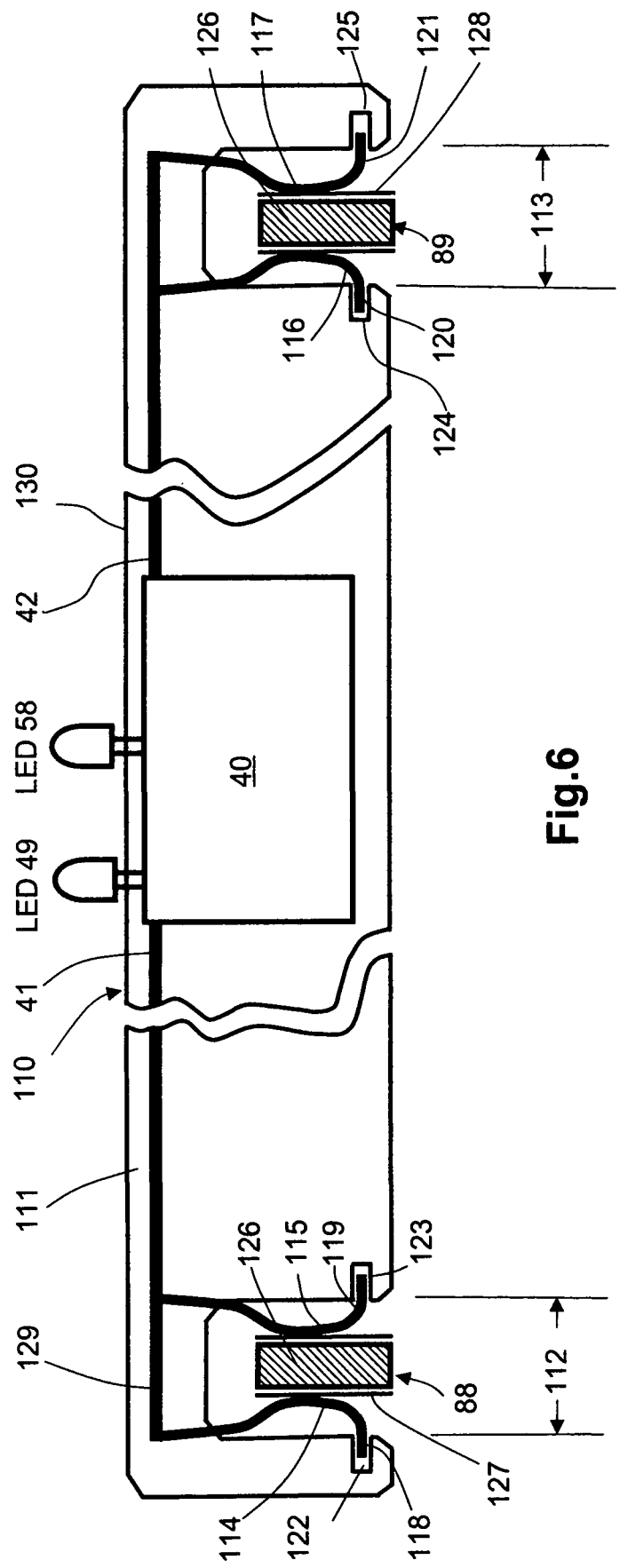
FIG. 6 is a front elevational view partially broken away of a single file folder special brace bearing the electrical components located at the file folder; and a pair of file drawer upper support members for the folder special brace showing the manner in which the folder special brace is removably attached to the upper support members of a cabinet file drawer.

The a-polar document receptacle identification circuit according to the invention can be used in both a file cabinet/multiple drawer system with document file folders and a notebook document binder system. FIGS. 4-6 illustrate use of the invention in a file cabinet/multiple drawer system with document file folders. FIG. 4 is a perspective view of a four drawer file cabinet incorporating the preferred embodiment of the invention. As seen in this Fig., a multiple drawer file cabinet 70 (four drawers illustrated) of known mechanical construction has the usual top 72, bottom 73, sides 74, 75, and back 76. Four drawers 78-81 are slidably mounted in cabinet 70, each drawer 78-81 having a drawer pull 83 mounted on a front panel 85 thereof. A visible indicator device 87 is also mounted on the front panel 85 of each drawer 78-81. Indicator 87 may comprise any one of a number of known elements capable of providing a visible signal when activated in the manner described below. Examples of suitable indicators are a conventional LED indicator, and a type 276-036 flashing LED indicator available from Radio Shack Corporation.

Lower-most drawer 78 is shown in the opened position in order to provide a perspective view of the basic drawer structure and the manner in which a file folder is removably supported in a file drawer. As shown, drawer 78 is provided with a pair of upper support members 88, 89 described in detail below, which serve the primary purpose of supporting individual file folders, such as file folder 90, in the drawer. Secondarily, support members 88, 89 may also provide structural rigidity for the drawer 78 itself. Drawer 78 also has a pair of lower members 92, 93 (only one of which (member 93) is visible in FIG. 4) which completes the horizontal structural elements. In a commonly used file cabinet structure, members 88, 89, 92, and 93 may form an inner frame insert (along with vertically arranged frame members) which can be physically installed in a standard drawer. To complete the drawer structure, a back 94 is connected to the members 88, 89, 92, 93. All file folders, such as folder 90, are removably supported by upper support members 88, 89 using horizontal file folder support braces (described below) to which the folder 90 is mechanically secured. The mechanical structure of folder 90 is conventional. The structure and arrangement of drawers 79-81 are identical to that of drawer 78. As indicated by the legended lead lines shown to the lower right of file cabinet 70, an A.C. power connection provides A.C. electrical power to the electronic components described below and located within file cabinet 70. Similarly, a hard-wired or Wifi connection is coupled between file cabinet 70 and an associated host computer for the purposes described below.

FIG. 5 is a perspective view of a typical file folder 90. As seen in this Fig., file folder 90 is a document receptacle formed from a single sheet of suitable material (typically durable paper stock) folded about the longitudinal center. Each leaf 95, 96 of file folder 90 is provided with a mechanical brace 97, 98 each secured to the upper margin of the associated leaf 95, 96. Each brace 97, 98 is provided with a pair of downwardly opening channels, such as channels 99, 100 of brace 97, adjacent the opposite ends thereof and designed to receive the upper support members 88, 89 of the respective cabinet drawer when the file folder 90 is installed in the drawer. Thus, the lateral spacing of channels 99, 100 of braces 97, 98 is chosen to match the lateral separation distance of drawer support members 88, 89 In use, one or more documents are inserted into the folder space between leafs 95, 96 of the file folder 90, and the file folder 90 is installed in one of the cabinet drawers by manipulating the file folder 90 downward into the cabinet drawer until the channels 99, 100 are received by the support members 88, 89. When the document is to be retrieved, the cabinet drawer is opened, the file folder 90 is either spread apart by the user and the desired document is removed from the folder 90, or the folder 90 itself is removed from the support members 88, 89, spread apart, and the desired document is removed.

One of the file folder braces 97, 98 is a conventional file folder mechanical brace fabricated from electrically non-conductive material, such as phenolic, printed circuit board material and the like. The other one of braces 97, 98 has the special construction illustrated in FIG. 6. With reference to FIG. 6, the special file folder brace generally designated with reference numeral 110 has an elongate body structure 111 formed from a suitable electrically non-conductive material, such as conventional circuit board material, phenolic, or the like. At each end, the elongate body structure has a cut-out channel 112, 113 having a width slightly larger than the width of the corresponding upper support member 88, 89. Each cut-out channel 112, 113 is provided with a pair of spring contacts 114-117 which are secured to the elongate body structure in any suitable manner, such as by heat stamping, gluing, or mechanically embedding. Each spring contact has a free end 118-121 which is received in a corresponding slot 122-125 formed in elongate body structure 111. The separation distance between the proximate portions of spring contacts 114-115, and 116-117 is slightly less than the width of the corresponding upper support member 88, 89 so that effective mechanical and electrical contact will be made when a brace 110 is installed on upper support members 88, 89. Each pair of spring contacts 114, 115 and 116, 117 is dedicated to a different document receptacle identification circuit 40 terminal, with spring contact pair 114, 115 electrically connected via conductive path 129 to terminal 41 of document receptacle identification circuit 40, and spring contact pair 116, 117 electrically connected via conductive path 130 to terminal 42 of document receptacle identification circuit 40. LEDs 42 and 58 are mounted to the upper margin of file folder brace 110, as illustrated.

Each upper support member 88, 89 has a central core 126 fabricated of electrically non-conductive material, such as the same material used for the fabrication of elongate body structure 111; and a single electrically conductive strip 127, 128 secured to the outer side surface and extending along the length of upper support members 88, 89. One of the conductive strips 127, 128 comprises the normally positive (+) system bus conductor which carries the data signals; the other one of conductive strips 127, 128 comprises the normally negative (−) system bus conductor which is connected to system ground.

Figure 7:
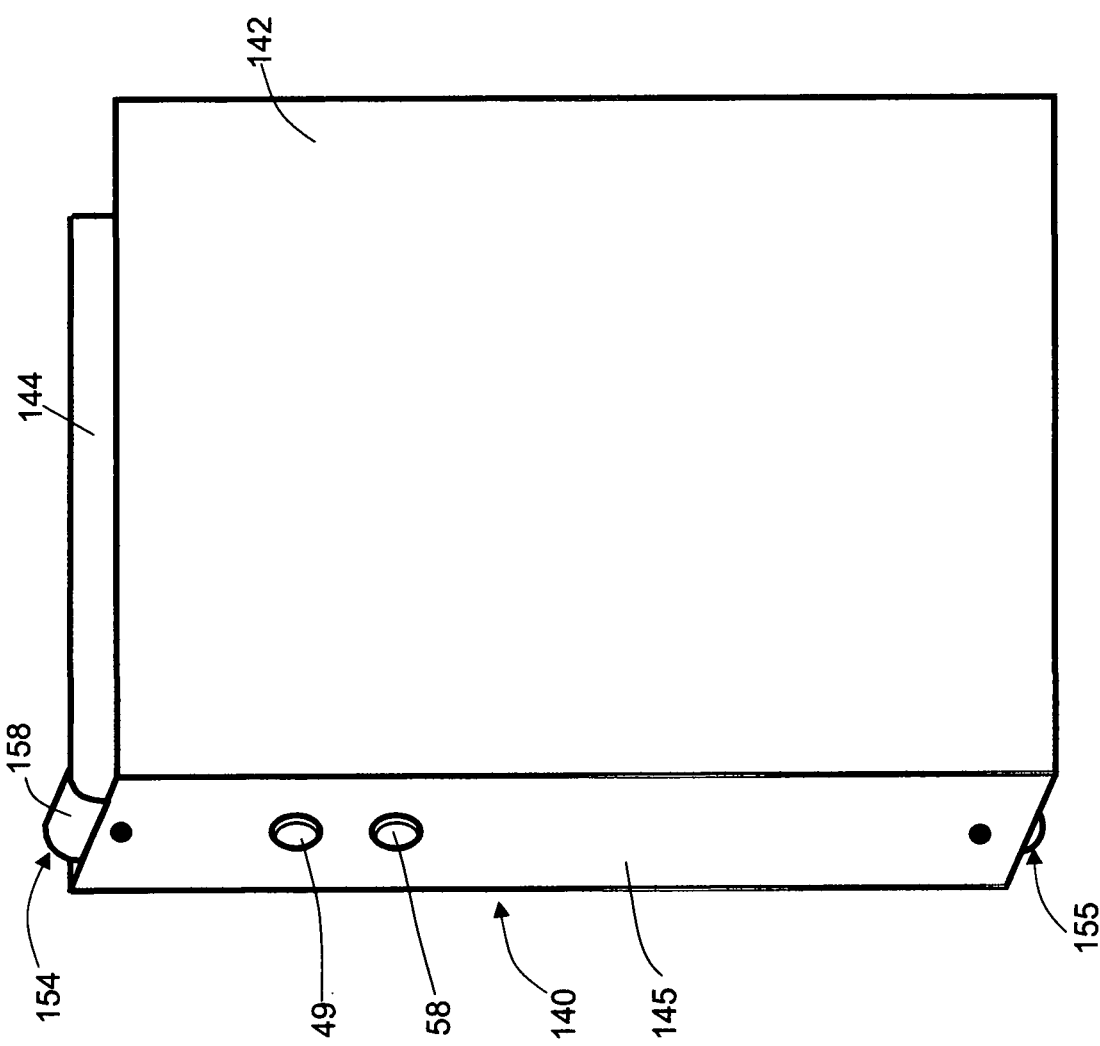
FIG. 7 is a perspective view of a notebook binder incorporating the FIG. 2 preferred embodiment the invention.
Figure 8:
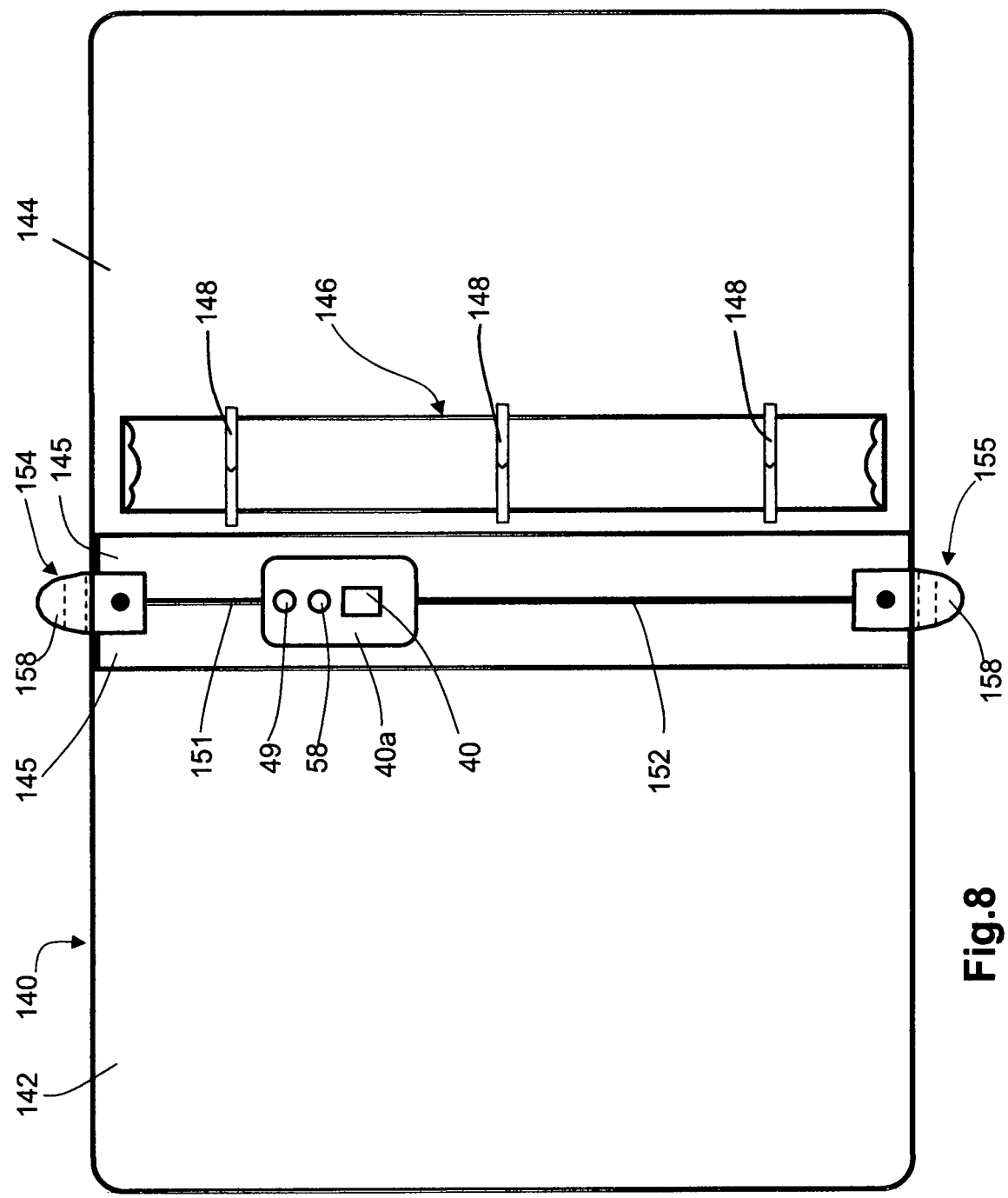
FIG. 8 is a plan view of the binder of FIG. 7 in the opened position.

As noted above, the a-polar document receptacle identification circuit according to the invention can be used in a notebook document binder system. FIGS. 7-10 illustrate use of the invention in a notebook document binder system. FIGS. 7 and 8 illustrate a single binder incorporating the a-polar document receptacle identification circuit according to the invention. As seen in these Figs., a binder 140 has a front cover 142, a back cover 144 and a spine 145 joining the front and back covers 142, 144. A conventional multi-ring manually operable binder mechanism 146 having a plurality (3 illustrated) of two-piece arcuate rings 148 is permanently mounted to the inner face of rear cover 144 to facilitate insertion, storage and removal of documents having a number of holes formed along a mounting edge, with the number of holes corresponding to the number of rings 148 of the binder mechanism 146. Mounted on the inner surface of spine 145 are an a-polar document receptacle identification circuit 40 (described more fully above)) carried by a substrate 40a, a pair of ohmic conductors 151, 152, an upper ohmic contact 154, a lower ohmic contact 155, and a pair of visible indicators 49, 58, preferably LEDs. Visible indicators 49, 58 are each mounted in an opening formed in spine 145 so as to be visible from the outer side of binder 140. Ohmic conductors 151, 152 are individually connected at the inner end to circuit terminals 41, 42. The other ends are connected to upper and lower ohmic contacts 154, 155 arranged on spine 145 in a position extending slightly above and below the upper and lower margins of spine 145 as shown. In the embodiment shown in FIGS. 7 and 8, each ohmic contact 154, 155 is a spring contact having a curved engagement portion 158 to promote sliding engagement with conductive strips described below which are carried by binder support shelves. This arrangement enables the upper and lower ohmic contacts 154, 155 to ohmically engage conductive strips mounted on the shelves described below on which the binder can be removably stored.

Figure 9:
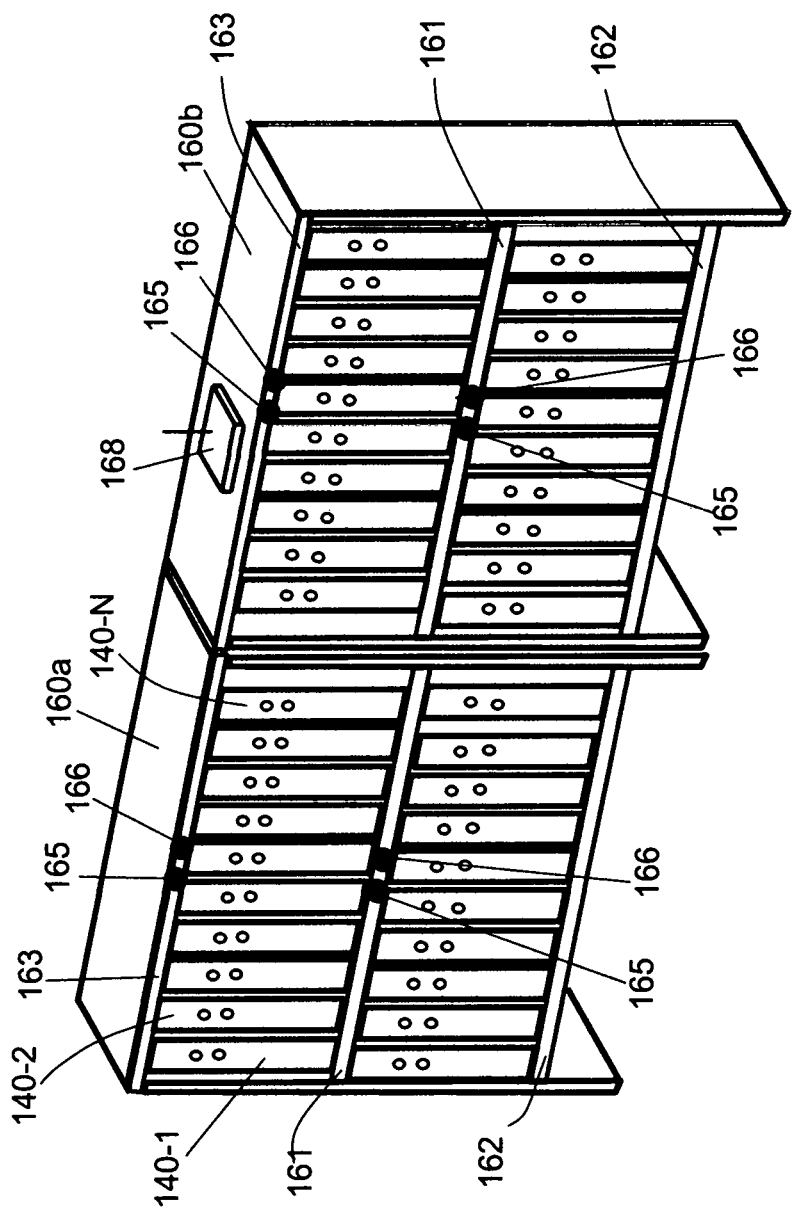
FIG. 9 is a perspective view of a pair of multiple-shelf binder storage cabinets.

FIG. 9 is a perspective view of a pair of multiple-shelf storage cabinets designed for use with the binder 140 of FIGS. 7 and 8. As seen in this Fig., each storage cabinet 160a, 160b has a plurality (2 illustrated) of storage shelves 161, 162 and a top shelf 163. A plurality of binders 140-1, 140-2, 140-N are removably received on a given shelf 161, 162. Each shelf 161, 162 has an associated visible indicator 165, preferably an LED; and an optional audible indicator 166, such as a type AT-1220-TT-R available from PUI Audio, Inc. of Dayton, Ohio, for a purpose to be described. Mounted on an appropriate portion of the pair of storage cabinets 160a, 160b is a unit 168 containing a local microcomputer and a conventional wireless transponder (Wifi unit) capable of sending and receiving information to and from a host computer.

Figure 10:
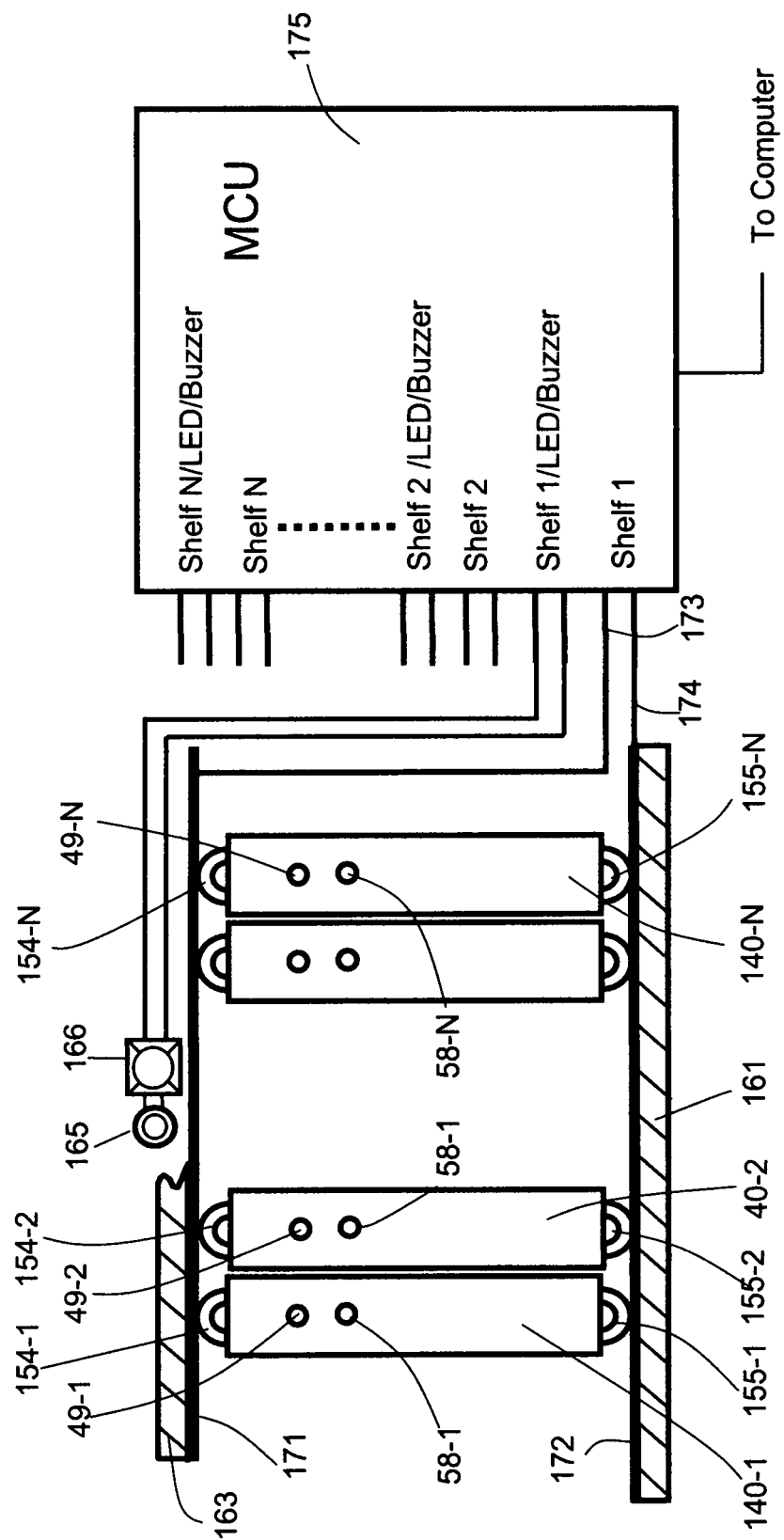
FIG. 10 is an enlarged partial front schematic view of a portion of a binder storage cabinet illustrating a removable contact arrangement and electrical components.

FIG. 10 is an enlarged partial front schematic view of that portion of binder storage cabinet 160b including top shelf 163 and middle shelf 161 and illustrating a removable contact arrangement and associated electrical components. As seen in this Fig., a first laterally extending ohmically conductive strip 171 is mounted to the undersurface of top shelf 163, and a second laterally extending ohmically conductive strip 172 is mounted to the top surface of underlying shelf 161. The position of each conductive strip 171, 172 is chosen such that the upper and lower contacts 154-i and 155-i of binders 140-i will engage the conductive strips 171, 172 so as to make ohmic contact therewith whenever a binder 140-i is installed on underlying shelf 161. Essentially similar ohmically conductive strips are mounted to the undersurface of shelf 161 and the top surface of shelf 162 to provide this same conductive capability. A local cabinet microcomputer (MCU) 175, such as a type AT89C2051 device available from Intel Corporation of Santa Clara, Calif. or a type LPC 1766 available from NXP Semiconductors of Eindhoven, The Netherlands, has a data output terminal 173 coupled to upper conductive strip 171 and an input terminal 174 coupled to lower conductive strip 172. As denoted by the lead lines and legends of FIG. 10, other input and output paired terminals are coupled to the conductive strips 171, 172 of the other shelf combinations. MCU 175 also has other paired input/output terminals labeled "Shelf 1/LED/Buzzer, Shelf 2/LED/Buzzer, . . . , Shelf N/LED/Buzzer" in FIG. 10 which are coupled to the visible indicators 165 and optional audible indicators 166 of each shelf pair. MCU 175 is also coupled by means of the wireless transponder noted above to a host computer as denoted by the legend "To Computer". As will now be apparent, when a binder 140-i having ohmic spring contacts 154-i, 155-i is installed on a shelf, these ohmic spring contacts 154-i, 155-i will engage the corresponding one of conductive strips 171, 172.

When MCU 175 receives a command from the host computer to search for a appropriate portion of the pair of storage cabinets 160a, 160b is a unit 168 containing a local microcomputer and a conventional wireless transponder (Wifi unit) capable of sending and receiving information to and from a host computer.

FIG. 10 is an enlarged partial front schematic view of that portion of binder storage cabinet 160b including top shelf 163 and middle shelf 161 and illustrating a removable contact arrangement and associated electrical components. As seen in this Fig., a first laterally extending ohmically conductive strip 171 is mounted to the undersurface of top shelf 163, and a second laterally extending ohmically conductive strip 172 is mounted to the top surface of underlying shelf 161. The position of each conductive strip 171, 172 is chosen such that the upper and lower contacts 154-i and 155-i of binders 140-i will engage the conductive strips 171, 172 so as to make ohmic contact therewith whenever a binder 140-i is installed on underlying shelf 161. Essentially similar ohmically conductive strips are mounted to the undersurface of shelf 161 and the top surface of shelf 162 to provide this same conductive capability. A local cabinet microcomputer (MCU) 175, such as a type AT89C2051 device available from Intel Corporation of Santa Clara, Calif. or a type LPC 1766 available from NXP Semiconductors of Eindhoven, The Netherlands, has a data output terminal 173 coupled to upper conductive strip 171 and an input terminal 174 coupled to lower conductive strip 172. As denoted by the lead lines and legends of FIG. 10, other input and output paired terminals are coupled to the conductive strips 171, 172 of the other shelf combinations. MCU 175 also has other paired input/output terminals labeled "Shelf 1/LED/Buzzer, Shelf 2/LED/Buzzer, . . . , Shelf N/LED/Buzzer" in FIG. 10 which are coupled to the visible indicators 165 and optional audible indicators 166 of each shelf pair. MCU 175 is also coupled by means of the wireless transponder noted above to a host computer as denoted by the legend "To Computer". As will now be apparent, when a binder 140-i having ohmic spring contacts 154-i, 155-i is installed on a shelf, these ohmic spring contacts 154-i, 155-i will engage the corresponding one of conductive strips 171, 172.

When MCU 175 receives a command from the host computer to search for a specific binder, the system identification code for that binder is coupled to all binders in a cabinet via conductive strips 171, 172 and binder contacts 154, 155 and thus to the receptacle identification circuits 40 in each binder 140. If a match occurs, the receptacle identification circuit in the matching binder responds to MCU175 in the manner described above. The user can then retrieve the matching binder and examine the documents contained therein. Since all receptacle identification circuits are a-polar, the physical orientation of the binders does not adversely affect the functionality of the receptacle identification circuits 40. Thus, any binder can be installed on a cabinet shelf without regard to polar orientation.

As will now be apparent document receptacle identification circuits fabricated according to the teachings of the invention offer unparalled flexibility of use over known circuits if this type. Due to the a-polarity of circuits according to the invention, the associated receptacle-whether a file folder or a notebook binder—may be installed in their respective storage containers without regard to polar orientation. This capability can greatly enhance ease of use.

Although the above provides a full and complete disclosure of the preferred embodiment of the invention, various modifications, alternate constructions and equivalents will occur to those skilled in the art. For example, while the invention has been described with reference to specific circuit components, other equivalent circuit components may be employed, as desired. Therefore, the above should not be construed as limiting the invention, which is defined by the appended claims.

What is claimed is:

1. An electronically addressable a-polar document receptacle identification circuit comprising:
   first and second terminals adapted to be ohmically connected to a two conductor system data bus;
   a two phase diode bridge circuit having first and second nodes connected respectively to said first and second terminals; and
   a circuit microcontroller (MCU) unit having a data signal input for receiving data signals from said two phase diode bridge circuit and a first output for providing response signals to at least one of said first and second nodes.

2. The invention of claim 1 wherein said two phase diode bridge circuit includes a rectifying diode for rectifying data signals present on said first and second terminals and a capacitor coupled to said rectifying diode and said circuit microcontroller for supplying D.C power to said circuit microcontroller when data signals are present at one of said first and second terminals.

3. The invention of claim 2 further including a first LED having an anode and a cathode, said anode being connected to said rectifying diode and said cathode being connected to circuit ground wherein said LED is activated when data signals are present at one of said first and second terminals.

4. The invention of claim 1 wherein said circuit microcontroller unit includes a second output and a memory having stored therein an identification code uniquely identifying the associated document receptacle; and further including a second LED having an anode connected to said second output and a cathode connected to circuit ground, said circuit microcontroller being configured to generate an activation signal on said second output when a data signal received at said circuit microcontroller data signal input matches said identification code.

5. The invention of claim 1 wherein said two phase diode bridge circuit comprises four diodes each having an anode and a cathode, a first one of said four diodes having a cathode connected to said first node and an anode connected to circuit ground, a second diode having an anode connected to said first node, a third diode having a cathode connected to said second node and an anode connected to circuit ground, and a fourth diode having an anode connected to said second node and a cathode connected to the cathode of said second diode.

6. The invention of claim 5 further including a first channel diode having an anode connected to said first node and a cathode coupled to said data signal input of said circuit microcontroller unit; and a second channel diode having an anode connected to said second node and a cathode coupled to said data signal input of said circuit microcontroller unit.

7. The invention of claim 5 wherein each of said four diodes are germanium diodes.

8. The invention of claim 1 wherein said document receptacle identification circuit is incorporated into a file folder support brace.

9. The invention of claim 1 wherein said document receptacle identification circuit is incorporated into a notebook binder.

* * * * *